United States Patent
Booth

(10) Patent No.: US 6,497,550 B2
(45) Date of Patent: Dec. 24, 2002

(54) GAS TURBINE ENGINE BLADE CONTAINMENT ASSEMBLY

(75) Inventor: Stephen J Booth, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/804,298

(22) Filed: Mar. 13, 2001

(65) Prior Publication Data

US 2001/0028840 A1 Oct. 11, 2001

(30) Foreign Application Priority Data

Apr. 5, 2000 (GB) .......................... 0008193

(51) Int. Cl.$^7$ .................................. F01D 21/00
(52) U.S. Cl. .................. 415/9; 415/173.4; 60/223; 60/39.091
(58) Field of Search ............ 415/9, 173.4, 174.4, 415/222; 60/223, 226.1, 39.091

(56) References Cited

U.S. PATENT DOCUMENTS

| | | |
|---|---|---|
| 3,974,313 A | 8/1976 | James |
| 5,267,828 A * | 12/1993 | Lenhart et al. ........... 415/9 |
| 5,403,148 A | 4/1995 | Forrester |
| 5,406,148 A | 4/1995 | Forrester |
| 5,431,532 A | 7/1995 | Humke |
| 5,486,086 A | 1/1996 | Bellia |
| 5,516,258 A | 5/1996 | Newton |
| 5,885,056 A | 3/1999 | Goodwin |
| 6,179,551 B1 * | 1/2001 | Sathianathan et al. ......... 415/9 |

FOREIGN PATENT DOCUMENTS

| | | |
|---|---|---|
| EP | 0 184 962 D E | 6/1986 |
| EP | 965731 A | 12/1999 |
| EP | 0 965 731 A | 12/1999 |

* cited by examiner

Primary Examiner—Edward K. Look
Assistant Examiner—James M McAleenan
(74) Attorney, Agent, or Firm—Warren Taltavull; Manelli Denison & Salter PLLC

(57) ABSTRACT

A gas turbine engine fan blade containment assembly (38) comprising a generally cylindrical, or frustoconical, metal casing (40) has an upstream portion (56), a blade containment portion (54) and a transition portion (58). The upstream portion (56) has a flange (52) connecting the metal containment casing (40) to an axially adjacent casing. The upstream portion (56) of the casing (40) has a greater diameter ($D_1$) than the diameter ($D_2$) of the blade containment portion (54) and the blade containment portion (54) has a greater thickness ($T_2$) than the thickness ($T_1$) of the upstream portion (54). The transition portion (58) connects the blade containment portion (54) and the upstream portion (56) to transmit loads from the blade containment portion (54) to the upstream flange (42). The transition portion (58) has a smoothly curved increase in diameter between the blade containment portion (54) and the upstream portion (56) whereby the transition portion (58) is allowed to flex to reduce impact loads transmitted to the upstream flange (42).

10 Claims, 2 Drawing Sheets

GAS TURBINE ENGINE BLADE CONTAINMENT ASSEMBLY

FIELD OF THE INVENTION

The present invention relates to gas turbine engine casings, particularly gas turbine engine fan casings, more particularly to an improved blade containment assembly for use within or forming a part of the gas turbine engine casing.

BACKGROUND OF THE INVENTION

Turbofan gas turbine engines for powering aircraft conventionally comprise a core engine, which drives a fan. The fan comprises a number of radially extending fan blades mounted on a fan rotor which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility that with such engines that part, or all, of a f an blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas turbine engine casings is well known. It is known to provide generally cylindrical, or frustoconical, relatively thick metallic containment rings. It is also known to provide generally cylindrical, or frustoconical, locally thickened, isogrid, metallic containment rings. Furthermore it is known to provide strong fibrous material wound around relatively thin metallic casings or around the above mentioned containment casings. In the event that a blade becomes detached it passes through the casing and is contained by the fibrous material.

However, in the event that a blade becomes detached, the blade strikes the metal casing and a significant load is imparted from the main impact region of the metal casing to a flanged interface with an intake casing.

It is normal practice to transfer the impact loads along the metal casing using a stepped increase in diameter of the metal casing, as shown in our published European patent application No. EP0965731A2. The stepped increase in diameter of the metal casing produces a local increase in stresses due to the bending moment at the stepped increase in diameter. The bending moments are counteracted by locally thickening the metal casing at the stepped increase in diameter of the metal casing. The locally thickened stepped increase in diameter adds weight to the metal casing, and the weight may be considerable if the metal casing is for a high bypass ratio turbofan gas turbine engine.

SUMMARY OF THE INVENTION

Accordingly the present invention seeks to provide a novel gas turbine engine casing which overcomes the above mentioned problems.

Accordingly the present invention provides a gas turbine engine rotor blade containment assembly comprising a generally cylindrical, or frustoconical, containment casing, the containment casing having an upstream portion, a blade containment portion and a transition portion, the upstream portion having a flange connecting the containment casing to an axially adjacent casing, the blade containment region being downstream of the upstream portion, the diameter of the upstream portion of the casing being greater than the diameter of blade containment portion and the thickness of the blade containment portion being greater than the thickness of the upstream portion, the transition portion connecting the blade containment portion and the upstream portion to transmit loads from the blade containment portion to the upstream flange, the transition portion having a smoothly curved increase in diameter between the blade containment portion and the upstream portion whereby the transition region is allowed to flex to reduce impact loads transmitted to the upstream flange.

Preferably the thickness of the transition portion being substantially the same as the thickness of the upstream portion of the containment casing.

The thickness of the transition portion may be between 75% and 125% of the thickness of the upstream portion of the containment casing.

The casing may have ribs and/or flanges. One or more continuous layers of a strong fibrous material may be wound around the casing.

The casing may comprise any suitable metal or metal alloy. Preferably the metal casing comprises a steel alloy, aluminium, an aluminium alloy, magnesium, a magnesium alloy, titanium, a titanium alloy, nickel or a nickel alloy.

An acoustic lining may be provided within the casing. The blade containment portion may have a radially inwardly and axially upstream extending flange, the flange being arranged at the upstream end of the blade containment portion.

The containment casing may be a fan containment casing, a compressor containment casing or a turbine containment casing.

BRIEF DESCRIPTION OF THE DRAWINGS

The present invention will be more fully described by way of example with reference to the accompanying drawings in which.

DETAILED DESCRIPTION OF THE INVENTION

Figure 1:
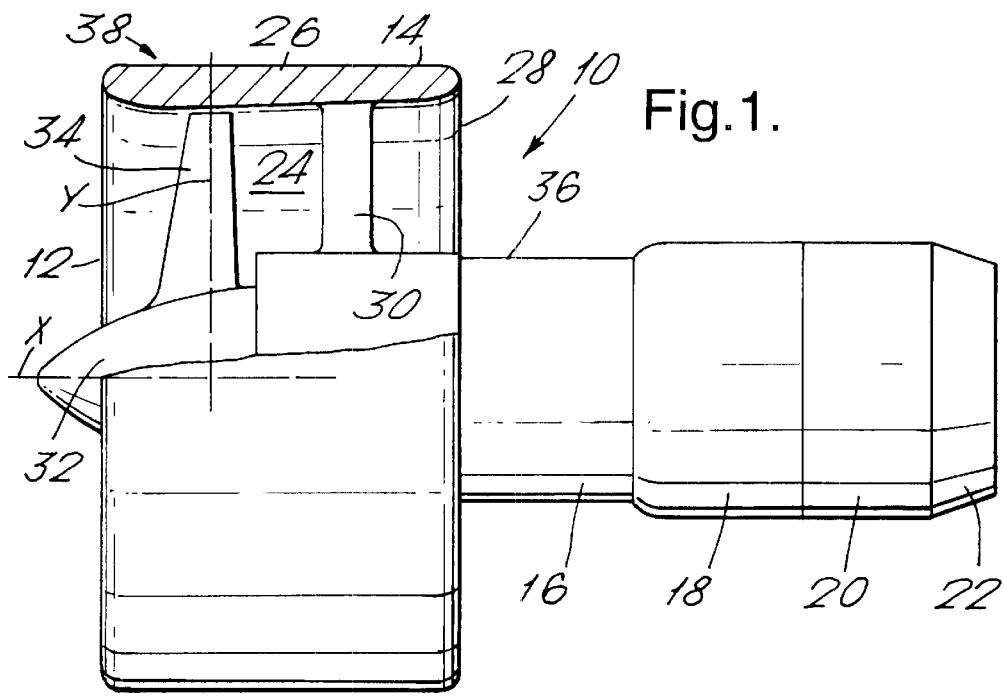
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustor section 18, a turbine section 20 and an exhaust 22. The turbine section 20 comprises one or more turbines arranged to drive one or more compressors in the compressor section 16 via shafts (not shown). The turbine section 20 also comprises a turbine to drive the fan section 14 via a shaft (not shown). The fan section 14 comprises a fan duct 24 defined partially by a fan casing 26. The fan duct 24 has an outlet 28 at its axially downstream end. The fan casing 26 is secured to the core engine casing 36 by a plurality of radially extending fan outlet guide vanes 30. The fan casing surrounds a fan rotor 32, which carries a plurality of circumferentially spaced radially extending fan blades 34. The fan rotor 32 and fan blades 34 rotate about the axis X of the gas turbine engine 10, substantially in a plane Y perpendicular to the axis X. The fan casing 26 also comprises a fan blade containment assembly 38, which is arranged substantially in the plane of the fan blades 34.

Figure 2:
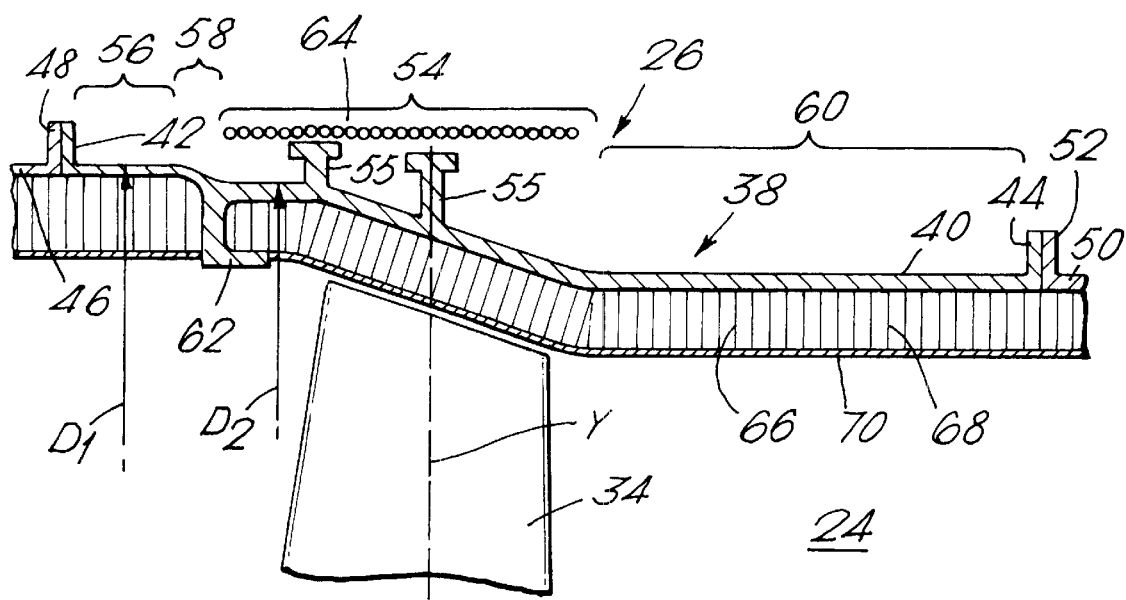
FIG. 2 is an enlarged view of the fan blade containment assembly shown in FIG. 1.
Figure 3:
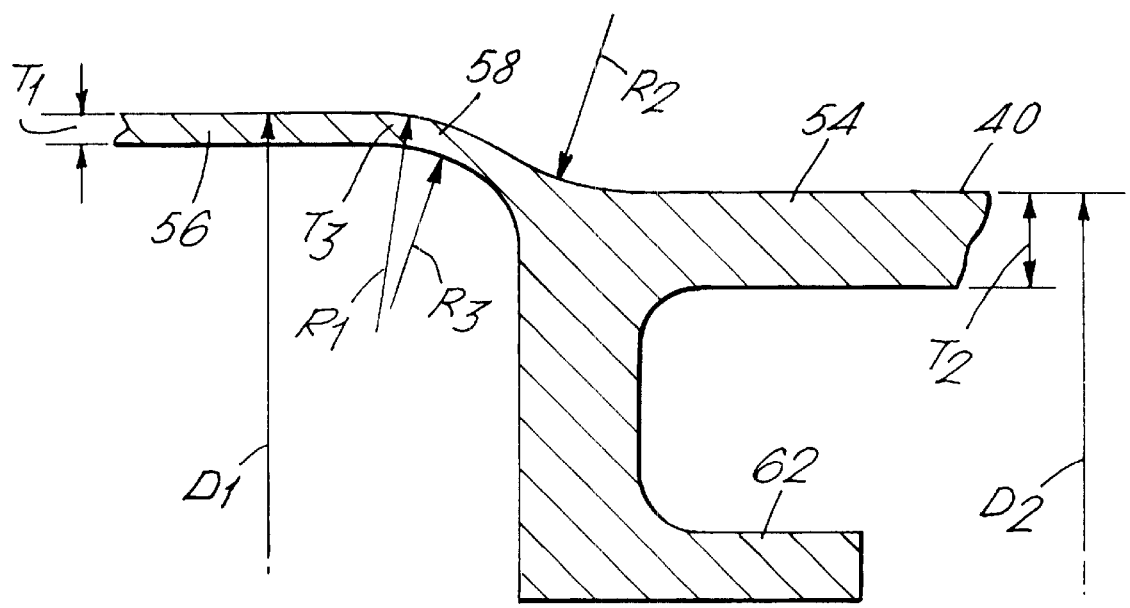
FIG. 3 is a further enlarged view of portion of the fan blade containment assembly shown in FIG. 2.

The fan casing 26 and fan blade containment assembly 38 is shown more clearly in FIGS. 2 and 3. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 26. The metal casing 40 also comprises a downstream flange 44 by which the fan blade containment assembly 38 is connected to a flange 52 on a rear portion 50 of the fan casing 26.

The metal casing 40 provides the basic fan blade containment and provides a connection between the intake casing 46 and the rear casing 50.

The metal casing 40 comprises an upstream portion 56, a transition portion 58, a main blade containment portion 54 and a downstream portion 60. The upstream portion 56 comprises the flange 42 and the downstream portion 60 comprises the flange 52.

The upstream portion 56 is upstream of the plane Y of the fan blades 34 and provides debris protection for the fan blade containment assembly 38. The main blade containment portion 54 is substantially in the plane Y containing the fan blades 34 and comprises a radially inwardly and axially downstream extending flange, or hook, 62 at its upstream end. The main blade containment portion 54 may also comprise one, or more, integral T section ribs 55 which extend radially outwardly from the main blade containment portion 54. The T section ribs 55 extend circumferentially around the main blade containment portion 54 to stiffen the metal casing 40 to improve the fan blade 34 containment properties. The transition portion 58 connects the main blade containment portion 54 and the upstream portion 56 to transmit loads from the main blade containment portion 54 to the upstream flange on the upstream portion 56. The downstream portion 60 is downstream of the plane Y of the fan blades 34, and provides protection for where a root of a fan blade 34 impacts the fan blade containment assembly 38.

The upstream portion 56 of the metal casing 40 has a diameter $D_1$ greater than the diameter $D_2$ of the main blade containment portion 54. The main blade containment portion 54 has a thickness $T_2$ greater than the thickness $T_1$ of the upstream portion 56 of the metal casing 40.

The transition portion 58 has a smoothly curved increase in diameter between the diameter $D_2$ of the main blade containment portion 54 and the diameter $D_1$ of the upstream portion 56. The transition portion 58 has a thickness $T_3$ substantially the same as the thickness $T_1$ of the upstream portion 56. In particular the smoothly curved increase in diameter of the transition portion 58, in axial section, is defined by two large diameter radii $R_1$ and $R_2$ at its outer surface and a single radius $R_3$ at its inner surface.

It may be desirable in some circumstances to provide a number of continuous layers of a strong fibrous material 64 wound around the metal casing 40 to further increase the energy absorbing capability of the fan blade containment assembly 38. The strong fibrous material 64 may for example be woven aromatic polyamide fibres known as KEVLAR (KEVLAR is a registered trademark of Dupont Ltd). There may also be a number of layers of discrete pieces of flexible material woven from KEVLAR between the metal casing 40 and the continuous layers of fibrous material 64.

An acoustic lining 66 may be provided on the inner surface of the metal casing 40. The acoustic lining 66 comprises a honeycomb 68 and a perforate sheet 70. The honeycomb 68 and perforate sheet 70 are quite conventional.

In operation of the gas turbine engine 10, in the event that a fan blade 34, or a portion of a fan blade 34, becomes detached it encounters the metal casing 40. The main blade containment portion 54 of the metal casing 40 is impacted by the fan blade 34, or portion of the fan blade 34, and effectively removes energy from the fan blade 34, or portion of the fan blade 34.

The impact loads are transferred from the main blade impact portion 54 of the metal casing to the flange 42 on the upstream portion 56 of the metal casing 40 through the transition portion 58 of the metal casing 40. The transition portion 58 is arranged to flex during the impact, due to its smoothly curved shape, to reduce the impact loads transmitted to the upstream flange 52. The transition portion 58 has reduced local stresses, compared to the conventional arrangement discussed above, due to the thickness of the transition portion 58 being substantially the same thickness as the upstream portion 56 and because of the large radii $R_1$, $R_2$ and $R_3$ shaping of the transition portion 58. The transition portion 58 has reduced weight, compared to the conventional arrangement discussed above, due to the reduced mass of material at the transition portion 58.

The metal casing may be manufactured from any suitable. metal or metal alloy. Preferably the metal casing comprises a steel alloy, aluminium, an aluminium alloy, magnesium, a magnesium alloy, titanium, a titanium alloy, nickels or a nickel alloy.

Although the invention has been described with reference to a metal casing it may be possible to use the invention on other types of casings.

The invention has been described with reference to a fan blade containment assembly, however it is equally applicable to a compressor blade containment assembly and a turbine blade containment assembly.

I claim:

1. A gas turbine engine rotor blade containment assembly comprising a generally cylindrical, or frustoconical, containment casing, the containment casing having an upstream portion, a blade containment portion and a transition portion, the upstream portion having a flange connecting the containment casing to an axially adjacent casing, the blade containment portion being downstream of the upstream portion, the diameter of the upstream portion of the casing being greater than the diameter of blade containment portion and the thickness of the blade containment portion being greater than the thickness of the upstream portion, the transition portion connecting the blade containment portion and the upstream portion to transmit loads from the blade containment portion to the flange of the upstream portion, the transition portion having a smoothly curved increase in diameter between the blade containment portion and the upstream portion, the transition portion having a smoothly curved increase in diameter between the blade containment portion and the upstream portion, the transition portion comprising a smoothly curved outer surface and the thickness of the transition portion is substantially constant and a smoothly curved inner surface such that the thickness of the transition portion is substantially the same thickness as the upstream portion of the containment casing whereby the transition region is allowed to flex to reduce impact loads transmitted to the flange of the upstream portion.

2. A gas turbine engine rotor blade containment assembly as claimed in claim 1 wherein the thickness of the transition portion being between 75% and 125% of the thickness of the upstream portion of the containment casing.

3. A gas turbine engine rotor blade containment assembly as claimed in claim 1, wherein the containment casing has ribs and/or flanges.

4. A gas turbine engine rotor blade containment assembly as claimed in claim 1, wherein at least one continuous layer of a strong fibrous material is wound around the containment casing.

5. A gas turbine engine rotor blade containment assembly as claimed in claim 1 wherein the containment casing comprises a metal selected from the group comprising a steel alloy, aluminium, an aluminium alloy, magnesium, a magnesium alloy, titanium, a titanium alloy, nickel and nickel alloy.

6. A gas turbine engine rotor blade containment assembly as claimed in claim 1 wherein an acoustic lining is provided within the containment casing.

7. A gas turbine engine rotor blade containment assembly as claimed in claim 1 wherein the containment casing is a fan containment casing, a compressor containment casing or a turbine containment casing.

8. A gas turbine engine rotor blade containment assembly as claimed in claim 1 wherein the smoothly curved outer surface is defined by two radii.

9. A gas turbine engine rotor blade containment assembly as claimed in claim 1 wherein the smoothly curved inner surface is defined by one radius.

10. A gas turbine engine rotor blade containment assembly comprising a generally cylindrical, or frustoconical, containment casing, the containment casing having an upstream portion, a blade containment portion and a transition portion, the upstream portion having a flange connecting the containment casing to an axially adjacent casing, the blade containment portion being downstream of the upstream portion, the diameter of the upstream portion of the casing being greater than the diameter of blade containment portion and the thickness of the blade containment portion being greater than the thickness of the upstream portion and the thickness of the transition portion is substantially constant, the transition portion connecting the blade containment portion and the upstream portion to transmit loads from the blade containment portion to the flange of the upstream portion, the transition portion having a smoothly curved increase in diameter between the blade containment portion and the upstream portion, the transition portion having a smoothly curved increase in diameter between the blade containment portion and the upstream portion, the transition portion comprising a smoothly curved outer surface and a smoothly curved inner surface such that the thickness of the transition portion is substantially the same thickness as the upstream portion of the containment casing whereby the transition region is allowed to flex to reduce impact loads transmitted to the flange of the upstream portion wherein the blade containment portion has a radially inwardly and axially downstream extending flange, the flange being arranged at the upstream end of the blade containment portion.

* * * * *